United States Patent Office 3,422,076
Patented Jan. 14, 1969

3,422,076
REACTION PRODUCT OF ALKYLATED HEXAMETHYLOLMELAMINES AND POLYANHYDRIDES
John Christos Petropoulos, Norwalk, and Jerry Norman Koral, Stamford, Conn., assignors to American Cyanamid Company, Stamford, Conn., a corporation of Maine
No Drawing. Filed Aug. 12, 1965, Ser. No. 479,304
U.S. Cl. 260—78.4         4 Claims
Int. Cl. C08g 9/36

ABSTRACT OF THE DISCLOSURE

A process for the production of a product which is soluble in a mixture of xylene and Cellosolve acetate and comprises alkylated methylolmelamine units linked together by anhydride units and the products, per se, are discussed.

---

The use of alkylated hexamethylolmelamines as additives and/or cross-linking agents with, for example, alkyd resins and epoxy resins, or as flow-promoters for urea-formaldehyde and triazine-aldehyde resins and the like is well known in the art. Although these alkylated hexamethylolmelamines are excellent in regard to increasing the gloss, hardness, etc. of these resins, they tend to decrease the viscosity of the resin to such an extent that the resultant system may not be useful for all the applications generally accorded the resin per se. That is to say, an alkylated hexamethylolmelamine, when added to a resin, results in a product which has a lower viscosity than that of the resin per se. Therefore, the resultant system lacks utility in applications wherein the high viscosity of the resin is a prerequisite.

We have now found that various products can be produced by reacting an alkylated hexamethylolmelamine with a polyanhydride, which products possess all the desirable properties mentioned above in regard to the alkylated hexamethylolmelamines per se, but do not exhibit a marked decrease in the viscosity of the resins with which they are blended. These novel products are also effective per se as cross-linking agents and further permit the formulation of coating compositions which have solids contents, at a useable spray viscosity, lower than the monomeric alkylated hexamethylol melamines. They may also be cast into hard, glossy films which are free of defects (craters etc.).

It is, therefore, an object of the present invention to provide a novel process for the production of alkylated hexamethylolmelamine reaction products.

It is a further object of the present invention to provide a process which comprises reacting a polyanhydride with an alkylated hexamethylolmelamine which, on the average, is not fully alkylated, to produce a polymeric alkylated amino resin.

It is a further object of the present invention to provide novel polymeric alkylated amino resins.

THE NOVEL METHOD

Our novel method, as mentioned above, comprises reacting a polyanhydride, or a mixture of a polyanhydride and up to 50%, by weight, based on the weight of the mixture, of a cyclic monoanhydride, with an alkylated hexamethylolmelamine.

The alkylated hexamethylolmelamines referred to herein are generally in the form of a mixture of compounds, which mixture of compounds, on the average, is not fully alkylated. These mixtures are generally produced by reacting hexamethylolmelamine with an aliphatic alcohol. For purposes of this invention alcohols of from 1–4 carbon atoms are sufficient. When the alcohol is reacted with the hexamethylolmelamine, the resultant product is a mixture of alkylated compounds. While the production of pure alkylated hexamethylolmelamines is theoretically possible, the recovery of such materials has proven to be virtually impossible. As mentioned above, in preparing these compounds, the hexamethylolmelamines are generally first prepared and then reacted with the appropriate alcohol to produce the alkylated derivatives. The hexamethylolmelamine is, however, in fact, itself not a pure material, but instead has a degree of methylolation averaging between about 5.8 and 6.1 methylol groups per mol of melamine. Theoretically, at least, melamine can only accept, as a maximum, 6 moles of formaldehyde per mol of melamine to form hexamethylol melamine. However, analytical determinations have frequently shown that the degree of methylolation sometimes exceeds the 6:1 ratio, and this seeming departure from theory is not readily understood nor is there any attempt to explain it set forth herein. When the degree of methylolation is less than six, however, i.e. 5.8 or 5.9, it must be concluded that there exists in the compositions, some hexamethylolmelamine and various other minor proportions of the lesser methylolated derivative, such as the pentamethylolmelamine. Therefore, when the material is alkylated, the resultant product is also a mixture of alkylated polymethylolmelamines. We have found that compositions of this type which contain, on the average, from about 3 to 5.8, alkyl groups are useful in the instant process in that the reaction occurs via the nonalkylated hydroxyl groups remaining after alkylation. As a consequence, when reference is made to alkylated hexamethylolmelamines as starting materials in the process of the present invention, it should be understood that a mixture of the alkylated polymethylolated melamines is intended, although pure compounds may also be used.

Examples of methods for the production of these alkylated hexamethylolmelamine compositions are set forth in U.S. Patents Nos. 2,918,452, 2,998,410 and 2,998,411. Further useful compositions are set forth in our copending application, Ser. No. 326,347, filed Nov. 27, 1963.

Any material which contains more than one anhydride group may be used as the second reactant in our novel process. That is to say, compounds, mixtures of compounds, resins, polymers and the like may be used in our novel process.

Examples of polyanhydrides which may be utilized include benzophenone dianhydride, pyromellitic dianhydride, 3,4-dicarboxy-1,2,3,4-tetrahydro-1-naphthalene succinic dianhydride, cyclohexane dianhydride, cyclopentane dianhydride, and various polyanhydrides produced by reacting maleic anhydride, itaconic anhydride, etc. with such materials as styrene, vinyl toluene, etc. as disclosed and claimed in copending applications Ser. Nos. 442,207 and 442,209, filed Mar. 23, 1965, and 440,292, filed Mar. 16, 1965. As mentioned above, we may also utilize various homoploymers and copolymers, which contain at least two available reactive anhydride groups. Polymers of this type include, polymaleic anhydride, styrene-maleic anhydride copolymers, vinyl acetate-maleic anhydride copolymers, and the like. Cyclic monoanhydrides which may be used include phthalic anhydride, maleic anhydride, succinic anhydride and the like and derivatives thereof, in amounts up to 50% in admixture with the above enumerated polyanhydrides.

The concentration of the melamine to polyanhydride should range from about 5:1 to about 1:5, preferably from about 2½:1 to about 1:1½, respectively.

The reaction is conducted in the absence of a catalyst and in the absence or the presence of a solvent such as a xylene-Cellosolve acetate mixture, a toluene-Cellosolve acetate mixture, a dimethylformamide - xylene mixture and the like.

The temperature at which our novel method is conducted ranges from about 95° C. to about 150° C., preferably 110–140° C.

At temperatures below about 95° C., substantially no reaction occurs, while at temperatures substantially above 150° C., a gel-like product is formed, which product is insufficient in its properties for the uses contemplated herein. The reaction must be allowed to continue for at least 5 minutes and preferably from about 1 hour to about 5 hours. Atmospheric pressure should be utilized. Superatmospheric pressure, however, should be avoided in that the volatiles which result from the reaction are difficultly released at high pressure.

The reaction may be carried out in the presence of air, oxygen, etc. or any inert gas may be utilized as a blanket in order to prevent contamination and undesired side reactions.

THE NOVEL PRODUCTS

As mentioned above, our novel products are polymeric in nature and generally consist of alkylated methylolmelamine units linked together by anhydride molecules. The novel products are clear, glassy, light yellow to amber in color, brittle, resinous products. They are thermoplastic materials which melt at about 20° C. to 40° C. and have molecular weights ranging from about 1,000 to about 10,000.

As mentioned above, our novel products are useful for all the applications known in regard to alkylated hexamethylolmelamines per se. For example, they may be utilized as cross-linking agents for alkyd resins, acrylic resins, epoxy resins and the like. They may be utilized, as such, for laminating and coating as well as in other areas where amino resins find use.

The following examples are set forth for purposes of illustration only, but are not be construed as limitations on the instant invention except as set forth at the appended claims. All parts and percentages are by weight unless otherwise specified.

Example 1

A suitable reaction vessel, fitted with a stirrer and thermometer, is charged with 1865 parts of a mixture of methylated hexamethylol melamines having an average of 5.0 methyl and 5.9 methylol units, and 770 parts of 3,4 - dicarboxy - 1,2,3,4-tetrahydro-1-naphthalene succinic dianhydride. The reaction mixture is stirred and heated over a 2 hour period, at 128° C. A viscous, homogeneous liquid is obtained. The reaction mixture is held at this temperature for 65 minutes. The product is removed from the reactor and when cooled to room temperature becomes a brittle, glass-like material. The resin has an acid number of 63. A 60% solution in a 65/35 solvent mixture of xylene/Cellosolve acetate has a Gardner-Holdt bubble viscosity of T–U.

Example 2

A suitable reactor, fitted with a stirrer and thermometer, is charged with 125 parts of the methylated melamine of Example 1 and 100 parts of 3,4-dicarboxy-1,2,3,4-tetrahydro-1-naphthalene succinic dianhydride. The reaction mixture is stirred and heated over a 2½ hour period, at 130° C. A hard, homogeneous mass is obtained. The product is removed from the reactor and when cooled to room temperature forms a brittle, glass-like material. The resin has an acid number of 145. A 60% solution in a 65/35 solvent mixture of xylene/Cellosolve acetate has a Gardner-Holdt bubble viscosity of P.

Example 3

A suitable reactor, fitted with a stirrer and thermometer, is charged with 1410 parts of the methylated melamine of Example 1 and 577 parts of a styrene-maleic anhydride 65/35 copolymer. The reaction mixture is stirred and heated to 120° C. over a period of 45 minutes and held at that temperature for an additional 4½ hours. The resin is cooled and a brittle, amber mass is obtained. The resin has an acid number of 41. A 60% solution in a 65/35 solvent mixture of xylene-Cellosolve acetate has a Gardner-Holdt bubble viscosity of Q.

Example 4

A suitable reactor, fitted with a stirrer and thermometer, is charged with 84.5 parts of the methylated melamine of Example 1 and 47.5 parts of a styrene-maleic anhydride (65/35) copolymer. The reaction mixture is heated over a 15 minute period to a temperature of 123° C. and then the temperature is raised to 135° C. over the next twenty minutes. The resultant viscous mass is cooled and the acid number of the resin is 53. The Gardner-Holdt bubble viscosity of a 50% solids solution, in a 65/35 mixture of xylene and Cellosolve acetate, is H.

Example 5

A suitable reactor is charged with 1128 parts of the methylated melamine of Example 1, 420 parts of a styrene-maleic anhydride (75/25) copolymer and 200 parts of phthalic anhydride. The reaction mixture is heated to 120° C. over a 40 minute period and held at this temperature for 1 hour and 45 minutes. The viscous mass is cooled and the resultant resin has an acid number of 73. The Gardner-Holdt bubble viscosity of a 60% solids solution, in a 65/35 solvent blend of xylene/Cellosolve acetate, is R–S.

Following the procedure of Example 1, various other alkylated hexamethylolmelamines are reacted with various other polyanhydrides to produce the novel compositions of the instant invention. The results of these reactions are set forth hereinbelow in Table I.

TABLE I

| Ex. | Melamine compound | Polyanhydride | Product | | |
|---|---|---|---|---|---|
| | | | Acid No. | Gardner-Holdt [5] | Soluble |
| 6 | Butylated hexamethylol melamine- 3.0 (ave.) butyl and 5.8 (ave.) methylol groups. | Pyromellitic dianhydride | 50 | X–Y | Dimethyl formamide. |
| 7 | do | The reaction product of styrene and itaconic anhydride at 95° C. (m.p., 266–268° C.). | 45 | U–V | Xylene/Cellosolve acetate— 65/35. |
| 8 | do | 3,4-dicarboxy-1,2,3,4-tetrahydro-6 (and 7)-methyl-1-naphthalene-succinic dianhydride.[1] | 55 | T | Do. |
| 9 | Ethylated hexamethylol melamine- 4.9 (ave.) ethyl and 6.1 (ave.) methylol groups. | 3,4-dicarboxy-1,2,3,4-tetrahydro-6 (and 7)-butyl-1-naphthalene succinic dianhydride.[2] | 52 | T–U | Do. |
| 10 | do | 3,4,7,8-phenanthrene-tetracarboxylic-3,4,7,8-dianhydride-1,2,3,4,5,6,7,8-octahydro (phenanthrene dianhydride).[3] | 43 | R–S | Do. |
| 11 | Same as Ex. 1 | Benzophenone dianhydride | 48 | X | Dimethyl formamide. |
| 12 | do | Cyclohexane dianhydride | 65 | V–W | Do. |
| 13 | do | Copolymer of vinyl acetate (75) and maleic anhydride (25). | 55 | X | Do. |
| 14 | do | Poly(maleic anhydride)[4] | 100 | Z–Z1 | Do. |

[1] Produced by reacting maleic anhydride and vinyl toluene at 115° C.—M.P.=100° C.
[2] Produced by reacting maleic anhydride and butyl vinyl benzene at 115° C.—M.P.=100° C.
[3] Produced by reacting maleic anhydride with divinyl benzene at 95° C.
[4] M.W.=5,700.
[5] In the corresponding solvent.

We claim:
1. A composition consisting essentially of an alkylated hexamethylolmelamine having, on the average, from about 3.0 to 5.8 alkyl groups and 5.8 to 6.1 methylol groups and a polyanhydride, said composition being produced at a temperature ranging from about 95° C. to 150° C. for at least about 5 minutes, the ratio of melamine to polyanhydride ranging from about 5:1 to about 1:5, respectively, being characterized by solubility in a 65/35 mixture of xylene and Cellosolve acetate and comprising alkylated methylolmelamine units linked together by anhydride units.

2. A product according to claim 1 wherein the alkylated hexamethylolmelamine is a methylated hexamethylolmelamine.

3. A product according to claim 1 wherein said polyanhydride is 3,4-dicarboxy-1,2,3,4-tetrahydro-1-naphthalene succinic dianhydride.

4. A product according to claim 1 wherein said alkylated hexamethylolmelamine is a methylated hexamethylolmelamine and said polyanhydride is 3,4-dicarboxy-1,2,3,4-tetrahydro-1-naphthalene succinic dianhydride.

References Cited

UNITED STATES PATENTS 3,211,579  10/1965  Reiter _____ 117—138.8

JOSEPH L. SCHOFER, *Primary Examiner.*

C. A. HENDERSON, Jr., *Assistant Examiner.*

U.S. Cl. X.R.

117—138.8; 260—67.6, 2